Patented Aug. 18, 1936

2,051,765

UNITED STATES PATENT OFFICE 2,051,765

OIL SOLUBLE RESIN

Mortimer T. Harvey, East Orange, N. J., assignor to The Harvel Corporation, Newark, N. J., a corporation of New Jersey No Drawing. Application March 19, 1934, Serial No. 716,333

1 Claim. (Cl. 260—4)

The present invention relates generally to resins made from phenolic ethers by reaction with an aldehyde; and the present invention relates more particularly to oil soluble resins made with an aldehyde and reaction products of alkyl ethers of aromatic compounds and to methods and steps of making and using them, the alkyl group being of the secondary or tertiary arrangement.

Heretofore aromatic ethers of aliphatic compounds in which the alkyl radicle has more than three carbon atoms have been considered as being unreactive with formaldehyde or reactive with such great difficulty and expense as to be impractical. I have discovered or invented a method of obtaining a formaldehyde reaction with a certain class of compounds of this group, for illustrative example, tertiary butyl phenyl ether and tertiary amyl phenyl ether, which can be caused to combine with formaldehyde to form resinous condensation products, and these resins are soluble in oils, such as linseed oil and China-wood oil, for illustrative example, and in resins such, for example, as rosin, ester gums and fossil gums. I find also that the resins of the present invention dissolve phenolic resins such as cresol-formaldehyde and phenol-formaldehyde resins and take them into solution in drying oils, gums, resins and into paints, varnish and lacquer solvents. The products of the present invention are suitable for general use in the resin field, for making molded products, impregnations, electrical insulation, paints, varnishes, lacquers, baking enamels, and coatings for metal, paper, and so on.

According to the present invention I make a higher order alkyl ether of an aromatic compound by replacing the hydrogen of the hydroxyl group of a phenol with a corresponding aliphatic compound. As illustrative examples of suitable phenolic compounds, the following are given: carbolic acid, naphthol, cresylic acid, ortho cresol, meta cresol, para cresol, meta para cresol, and other phenols, the xylenols, as well as other homologues of these. As illustrative examples of higher order aliphatic compounds the following are given: tertiary butyl alcohol, tertiary butyl chloride, tertiary butyl amine, tertiary amyl alcohol, tertiary amyl chloride, and tertiary amyl amine and corresponding secondary compounds and with these can be classed generally the derivatives of butane, pentane, hexane, heptane, and so on, having a secondary or tertiary radicle. As illustrative examples of aldehydes suitable for making the products of the present invention the following are given: formaldehyde, paraformaldehyde, hexamethylenetetramine, acetaldehyde, and furfuraldehyde.

Illustrative examples of the making of tertiary alkyl aromatic ethers are as follows.

*Example A.*—One hundred parts by weight of meta para cresol and seventy parts of tertiary butyl alcohol are mixed together and kept at a temperature below 30° C. and constantly stirred and fifty cubic centimeters of concentrated sulphuric acid added in small increments, maintaining the temperature below 30° C., to keep any sulphonation at a minimum. After the addition of sulphuric acid has been completed, the stirring is continued for some time, for example, for two hours, after which the whole is left to stand for a number of hours, for example for six hours or to get complete separation of the ether layer from the heavier acid layer, when the latter is removed. The ether layer is then washed several times with water, several times with an alkaline solution, for example, a ten per cent caustic soda solution, and again several times with water, the ether being insoluble in the alkaline solution or in water. The ether so prepared can be used as hereinafter described to make a resin with an aldehyde or it can be further purified by distillation in the atmosphere or in vacuum. In this method some other dehydrating agent such, for example, as zinc chloride or phosphoric acid can be used in place of the sulphuric acid.

When the reaction exemplified by example A is used, that is, when an alcohol is used with a phenolic compound, in contact with sulphuric acid, to obtain a product reactive with an aldehyde to produce resinous material two such products are obtainable depending upon the time given to the reaction and the temperature thereof. One is the alkyl amyl ether and the other is an alkyl phenol, and both are reactive with aldehydes to make resinous materials. Time, temperature and other conditions for the reaction can be utilized for determining the product in order to obtain the phenol, the ether, or a mixture, and methods and steps therefor are set forth in my copending application Serial Number 23,022, filed May 23, 1935. For example, with phenol ($C_6H_5OH$) and tertiary butyl alcohol in contact with concentrated sulphuric acid either or both of tertiary butyl phenyl ether and para tertiary butyl phenol can be obtained, and both of these are reactive with aldehydes (formaldehyde in contact with an alkali, for example) to obtain oil soluble resinous materials. When the ether alone is produced it is washed with alkali to remove any by-products that are not oil soluble and when the alkyl phenol is produced the washing with alkali is determined by the nature of the particular phenol produced in relation to its solubility in alkaline solutions.

When tertiary butyl alcohol is reacted with phenol ($C_6H_5OH$) in contact with sulphuric acid at from 15° to 25° C. for two hours and then left stand over night at room temperature the resulting products are about equal parts of tertiary butyl phenyl ether and para tertiary butyl phenol; when the same reaction is carried on for about two hours at 5° to 15° C. and the reaction stopped by diluting or washing out the sulphuric acid with water the reaction product is, for the most part, tertiary butyl phenyl ether. When secondary amyl alcohol is reacted with phenol ($C_6H_5OH$) in contact with sulphuric acid for about two hours at 15° to 25° C. and then left stand over night at room temperature the resulting product is substantially all secondary amyl phenyl ether; when tertiary amyl alcohol is reacted with phenol in contact with sulphuric acid for about two hours at 15° to 25° C. and then left stand over night at room temperature, the resulting product is, for the most part, para tertiary amyl phenol, with a small amount of the tertiary amyl phenyl ether.

Other conditions and results are described and claimed in my said copending application to which reference is made above.

At the temperatures given in the above illustrative examples, the materials of the reactions have the inherent characteristic that substantially no sulphonation takes place.

*Example B.*—One hundred and twenty parts by weight of meta para cresol and fifty parts of caustic soda are dissolved together in one hundred parts of water and one hundred parts of tertiary butyl chloride added, and the whole refluxed under a condenser for several hours or until the phenols of the lower layer have substantially completely reacted with the tertiary butyl chloride of the upper layer to form the ether, as indicated by the proper increase in volume of the upper layer. The ether layer is separated and washed with ten per cent caustic soda solution to free it of unreacted phenols after which it is washed well with water.

The above examples A and B of making tertiary butyl phenyl ether are given not as particular but as general illustrative examples because ethers other than the one formed can be made in the same or in a corresponding manner, in accordance with the teachings of the present invention.

The ether, being prepared, can be reacted with an aldehyde to form a resin which is soluble in or with drying oils, resins and gums and which has other desirable and advantageous characteristics some of which are herein set forth. The tertiary alkyl aromatic ether-formaldehyde reaction can take place without or with a catalyst, acid or alkaline. Following is an example of making a reaction of tertiary butyl phenyl ether and formaldehyde with the aid of an alkaline catalyst.

*Example 1.*—One hundred parts by weight of tertiary butyl phenyl ether, one hundred parts of forty per cent formaldehyde solution, and ten parts of twenty-eight per cent ammonium hydroxide are heated together, either in the air or under a reflux condenser, until partial thickening takes place, when the water is completely removed as by first decanting and then heating under vacuum or in the air in shallow pans. This heating is carried on until the desired viscosity or melting point of the resulting resins is attained, whereupon the latter is ready for use.

It is not known what arrangement takes place between the ethers and the aldehyde during or in the condensation reaction, but the result is to produce resins which are soluble in drying oils, resins, gums and so on. Even in the case of the xylenols mentioned above these oil soluble resins are produced, contrary to present theories and expectations regarding (1) rearrangements of the ethers into substituted phenols and (2) activity of the various positions on the phenol nucleus in a reaction with formaldehyde.

Valuable advantages of the ethers and resins of the present invention are their characteristics of being chemically stable, and of being light colored, in some cases approaching the water white, and particularly of the unusual color stability which is characteristic of both the ethers and resins. This is so pronounced that an ether made from dark colored, aged phenol (carbolic acid) is quite light colored as is also the corresponding resin obtained therefrom. Also, the ethers and resins of the present invention are free of the heavy objectionable odors of phenols, the cresols and of the resins thereof, and have light odors in the nature of perfume base odors.

A great advantage of the color stability of the resins of the present invention is that they can be molded under heat and still retain their characteristic light color. The ether resins of the present invention, particularly those of the tertiary butyl and amyl ethers of cresylic acid, in addition to being oil soluble, have the characteristics of being insoluble in caustic solutions, of being hard and brittle at normal temperatures, and of being permanently fusible at higher temperatures.

Having thus described my invention, what I claim is:

A process of making an oil soluble resin which comprises the following steps: mixing together material selected from the group consisting of secondary and tertiary butyl and amyl alcohols and material selected from the group consisting of phenol, the cresols and the xylenols in contact with sulphuric acid while maintaining the temperature below 30° C., and condensing the resulting aralkyl product with an aldehyde with ammonia as a catalyst.

MORTIMER T. HARVEY.